United States Patent [19]

Evers-Euterneck

[11] 3,718,292
[45] Feb. 27, 1973

[54] ANGULAR SENSING SYSTEM USING A PAIR OF STRAPPED-DOWN RATE GYROS

[75] Inventor: Ernst T. Evers-Euterneck, Huntsville, Ala.

[73] Assignee: The United States of America as represented by the Secretary of the Army

[22] Filed: Jan. 7, 1971

[21] Appl. No.: 104,693

[52] U.S. Cl. ...........................244/3.11, 235/150.25
[51] Int. Cl. ............F41g 7/00, F41g 7/14, F41g 9/00
[58] Field of Search ................244/3.2, 3.11; 137/38; 235/150.25, 61.5

[56] References Cited

UNITED STATES PATENTS 3,476,129  11/1969  Halstenberg ..........................137/38
3,198,940  8/1965  Loper et al. ........................244/3.2 X Primary Examiner—Benjamin A. Borchelt
Assistant Examiner—Thomas H. Webb
Attorney—Harry M. Saragovitz, Edward J. Kelly, Herbert Berl and Aubrey J. Dunn

[57] ABSTRACT

An angular sensing system is disclosed in which two rate gyros are strapped-down to a transverse bulkhead of a missile, with their spin axes and input axes antiparallel, and their output axes parallel. Alignment loops for the gyros provide outputs resulting from inputs in the output axes and outputs resulting from inputs in the input axes of the gyros. The outputs are directly related to roll and yaw of the missile.

3 Claims, 3 Drawing Figures

Ernst T. Evers-Euterneck
INVENTOR

ANGULAR SENSING SYSTEM USING A PAIR OF STRAPPED-DOWN RATE GYROS

DEDICATORY CLAUSE

The invention described herein may be manufactured, used, and licensed by or for the Government for governmental purposes without the payment to me of any royalty thereon.

BACKGROUND OF THE INVENTION

This invention is in the field of missile guidance systems. The guidance of a missile may be accomplished by various means, such as electrical control over trailing wires, radio (or radar) control, inertial systems, etc. In order to inertially guide a missile, it is necessary to have information about movement of the missile about three mutually orthogonal axes, namely: pitch, roll and yaw. There are various known systems for obtaining this information by using various combinations in gyroscopes and accelerometers. Most of these systems are either complex electrically or mechanically, or both. The mechanical portions of these systems have the well known susceptibilities to vibrations and accelerations. Rate gyros are sometimes used in these systems but complex measures must be used to avoid cross-coupling errors in rate gyros. The present system is relative simple both mechanically and electrically, and, since it is strapped-down, it is very rugged. The use of relatively cheap off-the-shelf items such as rate gyros makes this invention easy and inexpensive to construct. The invention uses cross-coupling error to advantage.

SUMMARY OF THE INVENTION

The invention is an angular sensing system using a combination of two strapped-down rate gyros, with parallel output axes and antiparallel spin and input axes. Each gyro has a combination output containing information related to two inputs, both an input about the gyro input axis and an input about the gyro output axis. Since the spin and input axes are antiparallel and the output axes are parallel, the portions of the combination outputs related to information about the input axes are equal and opposite, and the portions of the combination outputs related to inputs about the output axes are equal and of the same sense. The combination outputs are so added, using summers and subtractors in alignment loops, that separate outputs are obtained from the two inputs.

DETAILED DESCRIPTION OF THE INVENTION

Figure 1:
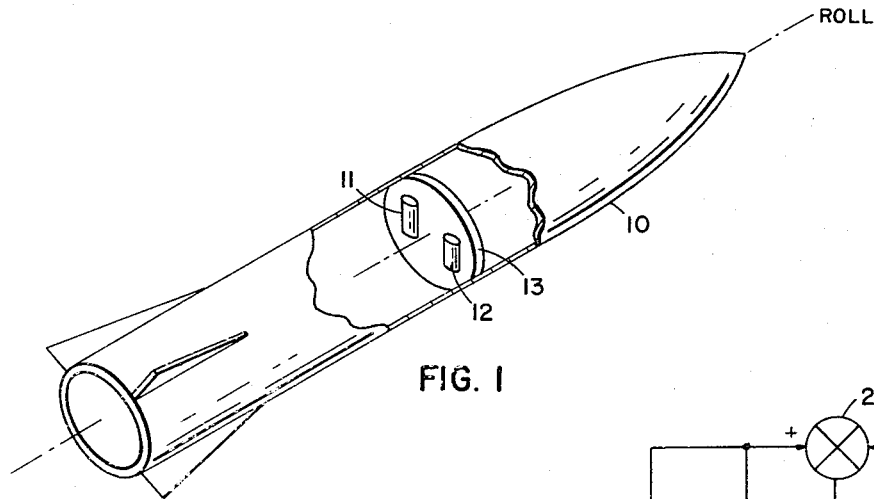
FIG. 1 shows the perspective view of a missile, with a portion of the skin broken away.

The invention may be best understood by referring to the drawings. In FIG. 1, missile 10 is shown with rate gyros 11 and 12 of the invention mounted on bulkhead 13. It should be understood that bulkhead 13 is perpendicular to the roll axis of the missile. Gyros 11 and 12 are parallel to each other and their midpoints are the same distance from the roll axis.

Figure 2:
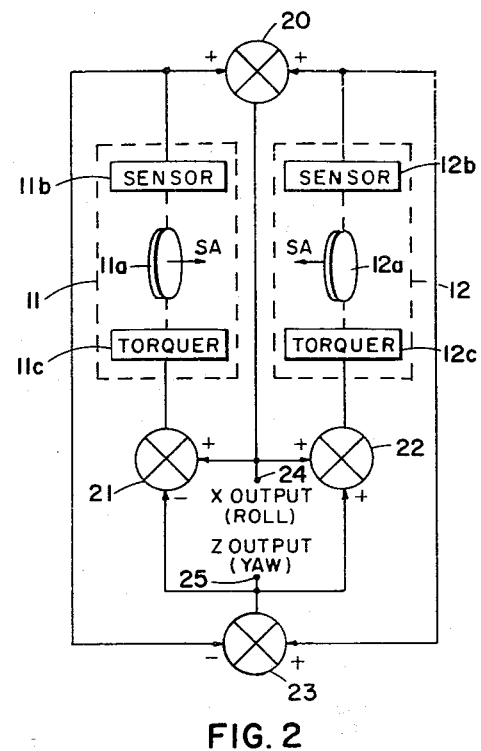
FIG. 2 is a schematic diagram of the invention.

The invention is shown schematically in FIG. 2; gyros 11 and 12 correspond to gyros 11 and 12 of FIG. 1. As can be seen in FIG. 2, each gyro consists of at least a rotor, a sensor, and a torquer, respectively designated as 11a, 11b, and 11c for gyro 11, and 12a, 12b, and 12c for gyro 12. These gyros are well known in the art, being so called "off-the-shelf" items. The gyros are so aligned that their longitudinal (output) axes are parallel and the spin axes of their rotors are antiparallel. Obviously, the input axes will be antiparallel. The outputs of sensors 11b and 12b are applied to inputs of summer 20. The output of 20 is applied to a positive input of each subtractor 21 and 22. The output of 11b is also applied to the negative input of subtractor 23 and the output of 12b is also applied to the positive input of subtractor 23. The output of subtractor 23 is applied to the negative input of subtractor 21, and to a positive input of summer 22. Output signals related to movement about the roll and yaw axes missile are respectively obtained at points 24 and 25.

Figure 3:
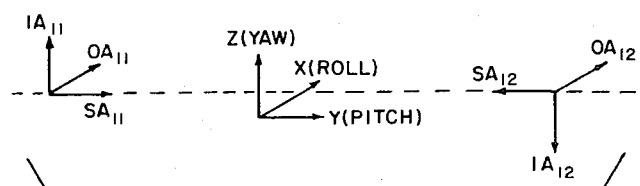
FIG. 3 is a graph showing various vectors associated with the invention.

FIG. 3 shows the arrangement of axes of FIG. 2. Spin axes $SA_{11}$ and $SA_{12}$ of the gyros are on a common line, and are antiparallel. This common line may pass through the center of gravity of the missile although FIG. 3 does not show this situation. The input axes $IA_{11}$ and $IA_{12}$, together with the spin axes, define a plane, with all of the input and spin axes in the plane. This plane is the plane of bulkhead 13. Output axes $OA_{11}$ and $OA_{12}$ are parallel to the missile roll axis and to each other. With the arrangement of axes as shown in FIG. 3, operation of FIG. 2 may be understood. For normal inputs (on the input axes) sensors 11b and 12b will provide equal and opposite outputs. Summer 20 thus has no output. Subtractor 23 will have an output, and this output will appear at point 25 as a yaw output. The subtractor 23 output will also be applied to subtractor 21 and summer 22. The output of 21 rebalances gyro 11 through torquer 11c and the output of 22 rebalances gyro 12 through torquer 12c. It should be understood that either the output terminals of the sensors or the input terminals of the torquers are so connected that the proper phase in the gyro loops is established. For outputs arising from inputs in the output axes, equal and same polarity signals will be provided by the sensors. These outputs will be summed in summer 20 and provide a roll output at point 24. This roll output is also applied to subtractor 21 and summer 22, to provide equal and same polarity inputs to the torquers. Subtractor 23 will have no output.

The various summers and subtractors shown in the invention are well known in the art. The summers need be nothing more than operational amplifiers with the same polarity inputs. The subtractors may be differential amplifiers or operational amplifiers with opposite polarity inputs.

The spin axes of the gyros of the invention are also known as momentum axes, the output axes as precession or gimbal axes and the input axes as quadrature axes. Obviously, the instant invention provides outputs for only two of the three maneuvering axes of a missile, the third output (pitch) may be obtained in various ways, such as by using an altimeter or by having another pair of strapped-down rate gyros with input axes parallel to the missile pitch axis.

I claim:

1. An angular sensing system including first and second rate gyros each having at least a rotor, a sensor, and a torquer, with said gyros being fixed to a common support with their output axes parallel; a first summer having an output and first and second inputs, with the inputs connected to respective sensors of said first and second gyros; a second summer having an output connected to the torquer of said second gyro, and having two inputs, with one of said outputs connected to said output of said first summer; a first subtractor having an output connected to said torquer of said first gyro and having a positive input and a negative input, with said positive input connected to said output of said first summer; a second subtractor having an output connected to the negative input of said first subtractor and to the other input of said second summer and having a negative input connected to said sensor of said first gyro and a positive input connected to the sensor of said second gyro, wherein said first summer output and said second subtractor output each respectively provide a discreet angular information signal, the spin axes of the gyros are maintained antiparallel, and the input axes of the gyros are maintained antiparallel.

2. The system as defined in claim 1 wherein said spin axes and said input axes are in a common plane.

3. The system as defined in claim 2 wherein said system is mounted in a guided missile, with said common plane perpendicular to the roll axis of said missile.

* * * * *